United States Patent Office 2,909,521
Patented Oct. 20, 1959

2,909,521
PHENTHIAZINE DERIVATIVES

Robert Michel Jacob, Ablon-sur-Seine, and Gilbert Louis Regnier, Paris, France, assignors to Societe des Usines Chimiques Rhone-Poulenc, Paris, France, a corporation of France No Drawing. Application July 25, 1958
Serial No. 750,872

Claims priority, application France August 1, 1956

1 Claim. (Cl. 260—243)

This invention relates to a new phenthiazine derivative, to processes for its production and to its use, and is a continuation in part of application Serial No. 673,153, filed July 22, 1957, now abandoned.

It is the object of this invention to provide a new phenthiazine derivative of value as an antihelmintic and particularly as a fungicide, the compound also being useful as an intermediate for the production of therapeutically important N-aminoalkyl-phenthiazines.

The new phenthiazine derivative of the present invention is 3-dimethylsulphamoylphenthiazine (Beilstein nomenclature).

According to a feature of the invention, the new compound is prepared by heating a mixture of 3-dimethylsulphamoyldiphenylamine and sulphur. The reaction is conveniently carried out at a temperature between about 150° and 250° C., preferably in an atmosphere of nitrogen and in the presence of a small quantity of iodine as catalyst. The 1- and 3-isomers which are formed simultaneously are separated by known methods.

According to a further feature of this invention, 3-dimethylsulphamoylphenthiazine is obtained, without the complication resulting from formation of the 1-substituted isomer, by bringing about cyclisation of a diphenyl sulphide of the formula:

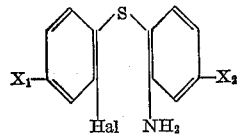

(wherein Hal represents a halogen atom such as chlorine or bromine, and one of the groups $X_1$ and $X_2$ represents a dimethylsulphamoyl group and the other a hydrogen atom) in an anhydrous solvent at elevated temperature in the presence of an acid-binding agent.

Preferred solvents are the N-substituted amides of fatty acids containing not more than 3 carbon atoms, e.g. dimethylformamide and N-methylacetamide, of which the former is preferred. Other suitable solvents include aromatic tertiary bases such as dimethylaniline.

The cyclisation is conveniently brought about by refluxing the reaction mixture. As the acid-binding agent, it is preferred to employ potassium carbonate or sodium carbonate; however, other agents such as sodium hydroxide can also be used. Under some conditions (such as when an alkali carbonate is employed) the reaction can be accelerated by means of a dehydrohalogenation catalyst such as copper powder.

As stated above, the compound of this invention is a valuable fungicide. Its value is illustrated by the following test data:

The product under test, in solution, emulsion or very fine suspension, was incorporated in Sabouraud's gelose, serving as nutrient medium, in a range of concentrations. The medium thus prepared was inoculated with a standardised suspension of spores or fragments of the fungus under test, the concentration being about 150,000 spores per ml., age eight to twenty-one days according to the species. After incubation at 24° C. for seven days the growth of the mould was noted. In the table of results set out later herein the figures given are the minimum concentrations of the test compounds in g./litre which totally inhibit mould growth.

TABLE

| Fungus | Minimum concentration for inhibition of fungus growth, in g./litre |
|---|---|
| Microsporum audouini | 2 |
| Microsporum felineum | 2 |
| Microsporum rubrum | 1 |
| Trichophyton mentagrophytes (strain F) | 2 |
| Trichophyton mentagrophytes (strain S) | 2 |
| Epidermophyton floccosum | 2 |
| Ctenomyces interdigitalis | 1 |

As indicated above, 3-dimethylsulphamoylphenthiazine is also an intermediate for conversion, by the application of known methods, into 3-dimethylsulphamoyl-N-aminoalkyl-phenthiazines of the general formula:

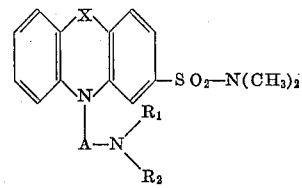

(wherein X represents a sulphur atom or an SO or $SO_2$ group, $R_1$ and $R_2$ are the same or different and either each represents a lower alkyl group or one of $R_1$ and $R_2$ represents a hydrogen atom and the other represents a lower alkyl group or $R_1$ and $R_2$ together with the adjacent nitrogen atom collectively represent a heterocyclic group and A represents a straight or branched chain divalent aliphatic hydrocarbon group containing two to five carbon atoms unsubstituted or substituted by a group

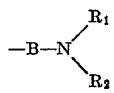

wherein B represents a single bond or a methylene group and $R_1$ and $R_2$ are as hereinbefore defined, the nitrogen atoms of the phenthiazine nucleus and of the grouping

being separated by at least two carbon atoms) which compounds have therapeutic utility; in particular as neuroleptics, potentiators of general anaesthetics and analgesics, antiemetics, catatonic agents, spasmolytics, hypotensors or antihistaminics.

The invention is illustrated by the following example in which the melting points have been determined on the Kofler block.

Example

2 - bromo - 2' - amino-4'-dimethylsulphamoyldiphenyl sulphide (1934 g.), M.P. 143–144° C., dissolved in dimethylformamide (14 kg.) is heated to boiling for 9 hours in the presence of dry potassium carbonate (750 g.) and copper powder (65 g.). When the reaction is complete, dimethylformamide (9.2 kg.) is distilled off under reduced pressure and the reaction mass obtained is poured into a 2.5% aqueous solution (25 kg.) of sulphuric acid. There is thus obtained crude 3-dimethylsulphamoylphenthiazine (1850 g.) which is purified by dissolving in benzene (12.3 kg.) and filtering through a column of alkaline alumina. After successive elutions with benzene and a mixture of benzene and ethyl acetate followed by evaporation of the eluates of benzene and the benzene-ethyl acetate mixture, there is finally obtained 3-dimethylsulphamoylphenthiazine (1000 g.), M.P. 176–177° C.

The 2-bromo-2'-amino-4'-dimethylsulphamoyldiphenyl sulphide starting material may be obtained by the reduction with iron and acetic acid of 2-bromo-2'-nitro-4'-dimethylsulphamoyldiphenyl sulphide, M.P. 140° C., itself obtained by the decomposition in the presence of cuprous bromide of the diazonium salt of 2-amino-2'-nitro-4'-dimethylsulphamoyldiphenyl sulphide, M.P. 163–164° C., prepared by the condensation of 2-aminothiophenol with 1 - dimethylsulphamoyl-3-nitro-4-chlorobenzene, M.P. 103° C.

We claim:
3-dimethylsulphamoylphenthiazine.

References Cited in the file of this patent

UNITED STATES PATENTS

| | | |
|---|---|---|
| 2,272,498 | Zerweck | Feb. 10, 1942 |
| 2,769,002 | Buisson | Oct. 30, 1956 |
| 2,789,978 | Rath | Apr. 23, 1957 |

FOREIGN PATENTS

| | | |
|---|---|---|
| 127,566 | Sweden | Mar. 4, 1950 |

OTHER REFERENCES

Wiselogle: Survey of Anti-Malarial Drugs, 1941–1945, vol. II, part I, p. 658 (J. W. Edwards, Ann Arbor, Mich., 1946).